(12) United States Patent
Cao et al.

(10) Patent No.: US 7,653,048 B2
(45) Date of Patent: Jan. 26, 2010

(54) METHOD AND APPARATUS FOR PROVIDING OPTIMAL VOIP CALL ROUTING IN VRF ENVIRONMENT

(75) Inventors: Feng Cao, Sunnyvale, CA (US); Radhika Padmanabhan, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1055 days.

(21) Appl. No.: 11/102,085

(22) Filed: Apr. 7, 2005

(65) Prior Publication Data

US 2006/0227765 A1   Oct. 12, 2006

(51) Int. Cl.
*H04L 12/66* (2006.01)

(52) U.S. Cl. ............. 370/352; 370/395.52; 370/395.53; 709/219

(58) Field of Classification Search .................. 370/352
See application file for complete search history.

(56) References Cited

U.S. PATENT DOCUMENTS

| | | | |
|---|---|---|---|
| 6,798,772 B2 | 9/2004 | Bergman et al. ............ 370/354 |
| 6,954,463 B1 | 10/2005 | Ma et al. .................... 370/401 |
| 7,330,463 B1* | 2/2008 | Bradd et al. ................ 370/352 |
| 2004/0223498 A1* | 11/2004 | Sanderson et al. ..... 370/395.52 |
| 2004/0223500 A1* | 11/2004 | Sanderson et al. ..... 370/395.53 |
| 2005/0068942 A1* | 3/2005 | Chu et al. ................... 370/352 |
| 2006/0146792 A1 | 7/2006 | Ramanchandra et al. .... 370/352 |

OTHER PUBLICATIONS http://www.packetizer.com/ipmc/h248/history.html: Packetizer, Inc, H248history, 2008.*

* cited by examiner

*Primary Examiner*—Quynh H Nguyen
(74) *Attorney, Agent, or Firm*—Brinks Hofer Gilson & Lione

(57) ABSTRACT

A method of providing VoIP call routing in a virtual private network is disclosed. A first gatekeeper issues an information request to a gateway. The first gatekeeper receives from the gateway information organized in a string and based on the information in this string recommends to a second gatekeeper a transmission route through a virtual private network. The second gatekeeper then uses this recommendation to select the transmission route for a VoIP call through the virtual private network.

17 Claims, 1 Drawing Sheet

METHOD AND APPARATUS FOR PROVIDING OPTIMAL VOIP CALL ROUTING IN VRF ENVIRONMENT

FIELD

The present invention relates broadly to network communications. Specifically, the present invention relates to providing call routing of voice over Internet protocol communication over a virtual private network.

BACKGROUND OF THE INVENTION

Virtual private network (VPN) routing and forwarding (referred to herein as VRF) has been used widely in data networks. There are many reasons for its popularity, including security, traffic engineering, and quality of service. A VRF site may utilize a routing and forwarding table associated with one or more directly connected VPN sites (such as customer edge routers and provider edge routers). This VRF table can also contain routes for other VPN sites not directly connected to the VRF site. Many platforms support VRF combined with multiprotocol labeled switching (MPLS) and/or VPN for data traffic.

The use of voice over Internet Protocol (VoIP) has gained momentum in the past several years and is increasing dramatically in both enterprise networks and service provider networks. However, in current VoIP solutions, call routing is handled by resolving a remote IP address, which doesn't satisfy VRF's routing requirement that a specified VRF label must be associated with a VRF route. Currently, there is no mechanism that provides efficient VoIP call routing over the current VRF environment.

Current VoIP standards, including H.323, session initiation protocol (SIP), media gateway control protocol (MGCP) and skinny client control protocol (SCCP), are completely unaware of the VRF routing. VoIP call routing by the existing VoIP protocols gives the remote IP addresses for both signaling and media, but it doesn't understand nor take advantage of the underlying VRF routing capability.

One approach to solving this problem is to use access control lists and virtual interfaces in local gateways to classify some VoIP calls into different VRF routes. This approach suffers several drawbacks. Access control lists and virtual interfaces fail if call routing is controlled by a central agent (such as gatekeeper, SIP proxy, or call agent), and don't provide necessary control on per-call VoIP routing. This approach also suffers scalability problems when more VRF routes are introduced.

Thus, there is a heartfelt need for an intelligent control mechanism for delivering VoIP call signaling traffic as well as VoIP media traffic through a desired VRF path. Also needed are intelligent controls such as bandwidth management and call admission control over shared VRF routes among all VoIP calls in a VRF environment, especially for H.323 zones controlled by a gatekeeper, SIP domains controlled by SIP proxy servers, and MGCP environments controlled by call agents.

SUMMARY OF THE INVENTION

The present invention solves the problems described above by providing enhanced VoIP call routing to fully and intelligently utilize VRF routes. In one aspect of the present invention, a notification mechanism is provided that shares VRF information between gateways and VoIP call routing controllers as well as between VoIP call routing controllers. In another aspect, the present invention provides an intelligent control mechanism that selects VRF routes and shared VRF resources.

In an embodiment of the present invention, a first gatekeeper issues an information request to a gateway. The first gatekeeper receives from the gateway information organized in a string and based on the information in this string recommends to a second gatekeeper a transmission route through a virtual private network. The second gatekeeper then uses this recommendation to select the transmission route for a VoIP call through the virtual private network.

In another embodiment, the present invention provides a gatekeeper for routing VoIP calls in a virtual private network. The gatekeeper includes a communication connection with another gatekeeper; a communication connection with each of at least one gateway located within the gatekeeper's zone; and a decision agent. The decision agent when executed by the gatekeeper, issues an information request to the at least one gateway; receives information from the at least one gateway, the information received being organized in a string; and recommends to the second gatekeeper a transmission route through the virtual private network based on the information received.

In yet another embodiment, the present invention provides a gateway for routing VoIP calls in a virtual private network. The gateway includes a communication connection with a gatekeeper; at least one communication connection to at least one other gateway in the virtual private network; and an update agent. The update agent when executed by the gateway, determines preferred transmission routes through the virtual private network; and communicates these preferred transmission routes to the gatekeeper.

Many other features and advantages of the present invention will be realized from reading the following description, when considered in conjunction with the drawing.

DETAILED DESCRIPTION

Figure 1:
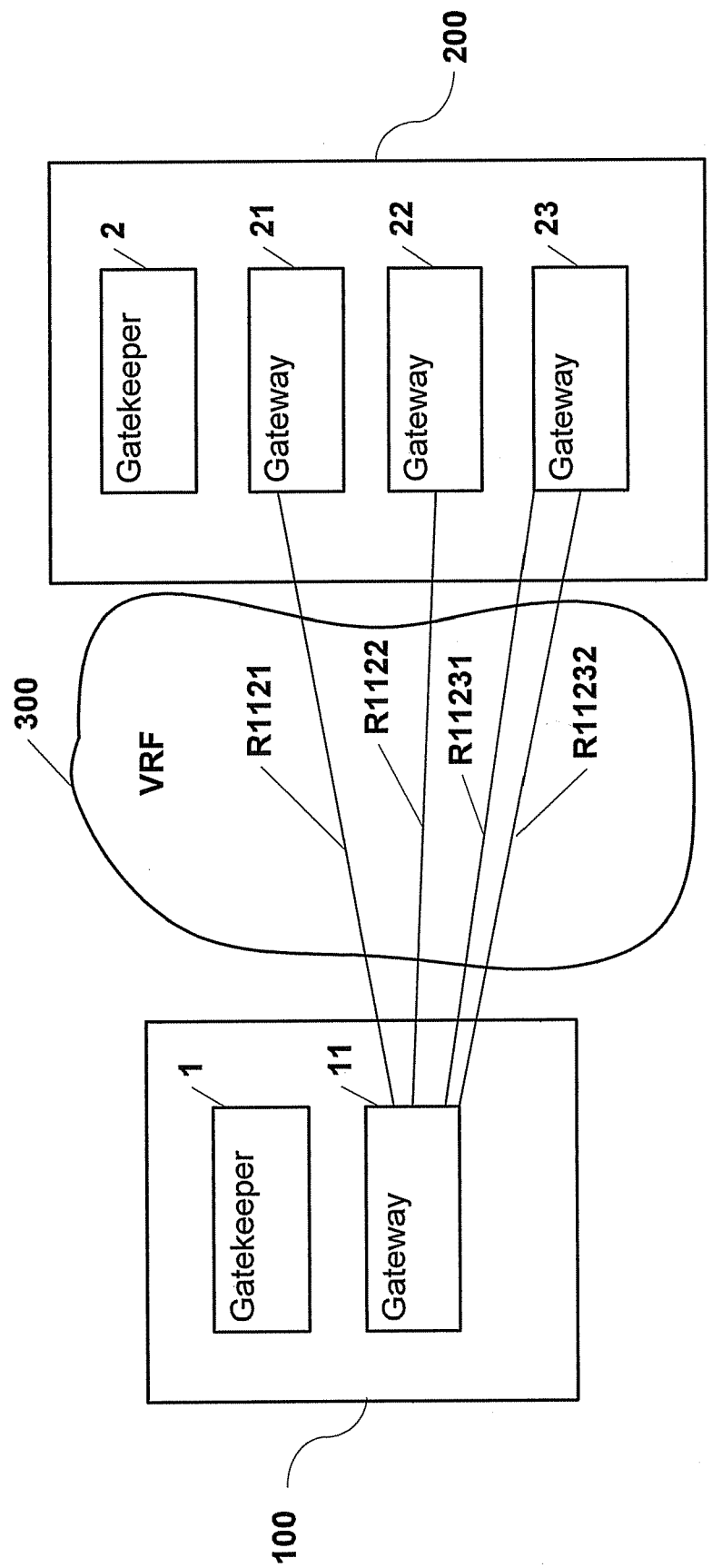
FIG. 1 illustrates a network of gatekeepers and gateways utilizing VRF routing in accordance with the present invention.

Directing attention to FIG. 1, gatekeeper 1 and gateway 11 are located in zone 100, and gatekeeper 2 and gateways 21, 22, 23 are located in zone 200. In an embodiment, gateways 11, 21, 22, 23 are H.323 gateways and gatekeepers 1, 2 are H.323 gatekeepers. In another embodiment, SIP endpoints and SIP proxies can be substituted for gateways 11, 21, 22, 23 and gatekeepers 1, 2, respectively. In another embodiment, MGCP endpoints and MGCP call agents can be substituted for gateways 11, 21, 22, 23 and gatekeepers 1, 2, respectively.

As shown in FIG. 1, gateway 11 is connected to gateways 21, 22, 23 by VRF 300. The gateways maintain VRF tables for the different VRF routes available through VRF 300 between the gateways. The present invention provides new commands to share information between a gateway and its gatekeeper. In an embodiment, these new commands are written in a language referred to as registration, admission and status (RAS), and include the commands VRQ, VCF, and VRJ. The command VRQ constitutes a VRF information request. The VRQ command is issued by a gatekeeper to a gateway. The gateway, upon receiving the VRQ, responds to the gatekeeper issuing the VRQ command with either a VCF command or a VRJ command. The VCF command constitutes a VRF information confirmation and is sent as a successful response to a VRQ command. In an embodiment, virtual routing information, such as contained in a gateway's virtual routing tables, or other information such as bandwidth predictions, the number of active cores through a given link, an indication of bursty/nonbursty traffic received over the gateway, and/or the rate of successful transmissions to specified destinations, is combined and organized as a string that is included with the VCF command sent back to the requesting gatekeeper. The VRJ command indicates a failure response, and rejects the VRF information requested by the gatekeeper that issued the VRQ. Upon receiving a VRQ from a gatekeeper, gateways 21, 22, 23 can keep sending VCFs and/or VCJs back to the gatekeeper to dynamically update the information about their respective VRF routes. Then gatekeeper 1 can recommend the preferred VRF labels along with the destination IP address sent back to the requesting gatekeeper 2 during call setup.

In an embodiment, the present invention provides new fields used with existing commands, for example, IRQ, ICF, and IRJ. The new fields are embedded into ICF for response back to gatekeeper. Using either the new commands of the present invention or existing commands modified to use the new fields of the present invention, a gatekeeper can collect all needed information from all the gateways inside its zone. For example, gatekeeper 1 can ask gateway 1 for its VRF routing information, such as which in label is associated with which in interface.

The present invention provides a new call routing approach based on VRF exchanges. The remote gatekeeper can recommend the preferred VRF labels along with the destination IP address when it receives a new LRQ message from the requesting gatekeeper. This new VRF information is embedded into current LCF messages or, in an embodiment, ACF messages. The location confirmation enhancement (LCF) message is then sent back to the requesting gatekeeper. The requesting gatekeeper can pass down the remote destination IP address and the preferred VRF label(s) back to gateway. This gateway will use new VRF label(s) along the destination IP address to pick up the VRF routes.

For example, gateway 11 sends an automatic repeat request (ARQ) to gatekeeper 1. Gatekeeper 1 sends a location request (LRQ) message to gatekeeper 2, gatekeeper 2 passes an LCF message including gateway 22's IP address and the preferred VRF label back to gatekeeper 1. Gatekeeper 1 sends an admission confirmation (ACF) message including new VRF information to gateway 11. Gateway 11 uses both the traditional remote destination IP address and VRF information described above to decide which route should be used to send calls to gateway 22.

Because VoIP calls are real-time traffic and have strong requirements on multiple resources, the intelligent control mechanism of the present invention shares VRF routes among VoIP calls to guarantee Quality of Service. The present invention provides optimal routing for VoIP calls going through VRF environments. The present invention also provides improved Quality of Service for VoIP calls through VRF environments, improved security control on VoIP calls through VRF environments, and improved voice traffic engineering on VoIP calls through VRF environments.

The gatekeeper is able to obtain knowledge of which VRF routes actually are congested as follows. The intelligent control mechanism of the present invention utilizes a real-time update agent in a gateway for its preferred VRF routes, and a decision agent in the gatekeeper for choosing the recommended list of VRF labels along with the destination IP address. The gateway monitors and collects the statistics with respect to VRF routes, and sends its preferred VRF route(s) back to the gatekeeper. Then the gatekeeper can use its heuristic algorithm to choose the best VRF route(s) among gateways. During call setup, the gatekeeper can notify other gatekeeper of its recommendation list.

Update Agent

Due to the real-time traffic through a gateway, the preferred VRF routes are selected dynamically. For example, a gateway may have a preference for in-interface S with VRF in-label A. Then out-label B with respect to in-label A experiences network congestion on B's out-interface T. Then the gateway's new preferred VRF in-label might be different from A for the traffic into in-interface S. The Update Agent in the gateway determines the new preferred VRF routes and updates the gatekeeper with this new information.

Decision Agent

There may be multiple gateways inside a gatekeeper's zone. After receiving the dynamic preferred VRF routes from all the gateways in its zone, the gatekeeper utilizes its decision agent to choose the best pair of destination IP address along with VRF label. How to define the best pair depends on the routing policies, such as least used VRF route, weighted round robin among VRF routes, least traffic, etc. The decision agent in the gatekeeper can be used for other functions such as admission control and billing.

An example of the present invention using MPLS-based VRF routes is described herein to illustrate how a gateway can monitor and collect traffic statistics for VRF routes. MPLS is realized between layer 2 and layer 3 by using label switching. Traffic statistics are contained inside the label switching code (even if it is in ASIC) for each VRF route in the gateway. Once the statistics are collected from the gateway, the gateway compares the statistics against earlier data to make predictions. For example, if one VRF route has experienced bursty traffic in the past several collection intervals, the gateway can use a heuristic prediction to determine when the next bursty traffic pattern might occur, and would recommend against using a bursty VRF route. Similarly, if another VRF route has experienced constant heavy traffic, the gateway can determine the reason locally (for example, traffic might be related to VoIP traffic or video traffic, as the gateway is responsible for setting up those media connections), a gateway can take the VRF route off its list of preferred VRF routes sent to the gatekeeper in the VCF command. The same function can be applied to the VRF route its traffic level is far below its configured capacity and the VRF route has bandwidth for accommodating additional VoIP calls. In this case, the gateway puts this VRF route into its list of preferred VRF routes with an indication of approximately how much bandwidth is available for the VRF route, and this information can also be included in the VCF command and sent back to gatekeeper.

The gatekeeper can choose the best route after receiving the recommendation lists from gateways as follows. A gatekeeper receives preferred VRF routes from each gateway. The gatekeeper can use heuristic algorithms to choose a set of qualified VRF routes and send the set to other gatekeepers during call setup. Preferably, the heuristic algorithm should include multiple factors such as billing, information describing load balancing among gateways, successful transmission rates per gateway, and load balancing among gatekeepers. Algorithms such as weighted round robin among the qualified VRF routes, or the least used among the qualified VRF routes, can also be used.

The present invention can be extended to handle SIP calls in SIP domains. The only extension is to add VRF route information into SDP, which is a common practice for adding vendor-specific extensions (and then standardized if applicable). An embodiment of the present invention provides update agents in SIP User Agents and decision agents in SIP domains that work the same as described above. The embodiments of the present invention can be extended to accommodate other VoIP signaling protocols used in a VRF environment.

VRF commands may be used to isolate network traffic, and are also used for data traffic. But VoIP traffic has real-time requirements and needs basic QoS. This is the reason that VoIP traffic cannot be treated as data traffic without meeting its basic QoS requirement during call setup and transmission. If it only relies on VRF's configuration, VoIP traffic will face the quality issues such as delay, jitter, packet loss, etc., for example because VoIP traffic cannot dynamically pick up the best VRF route satisfying its real-time requirement.

The present invention provides intelligent routing for VoIP traffic. "Intelligent" as used herein refers to efficiently chosen routes, dynamic load balancing, and scalable solution. Gateway 11 has multiple separate VRF routes to Zone 2, including VRF route R1121 to gateway 21, route R1122 to gateway 22, and routes R11231 and R11232 to gateway 23. When a VoIP call's setup goes from Zone 1 to Zone 2, gatekeeper 2 needs to choose one of gateway 21, gateway 22 and gateway 23 to relay the call. At that time, route R1121 to gateway 21 has bursty data traffic, route R1122 to gateway 22 has heavy video streaming, route R11231 to gateway 23 has heavy voice traffic, and route R11232 to gateway 23 has light traffic and enough bandwidth for new calls.

Without implementing the present invention, the static VRF configuration is used and gatekeeper 2 has no information about the VRF routes on its gateways. Then gatekeeper 2 could choose either gateway 21 or gateway 22 to relay the call. Gateway 11 will check its VRF tables and send the call setup to gateway 21 or gateway 22 through its VRF routes. This will introduce the bad VoIP quality because of either route R1121's burst traffic or route R1122's heavy video traffic.

Even if gatekeeper 2 happens to pick up gateway 23, it has no information about the two VRF routes R11231 and R11232. Then gatekeeper 2 will pass gateway 23's IP address back to gatekeeper 1. This still introduces the problem in gateway 11 to decide how to route the call to gateway 23. It is easy to see the manual configuration cannot dynamically pick up the best VRF routes in this case.

Through application of the present invention, the dynamic status of VRF routes is reported to gatekeeper 2 from gateways 21, 22, 23. Each of gateways 21, 22, 23 also specifies its preference on the incoming VRF route into itself. In this case, only gateway 23 reports its feasible route R11232 with the incoming label back to gatekeeper 2. Based on this information, gatekeeper 2 can recommend route R11232 and its related information as the best VRF route back to gatekeeper 1. Then gateway 11 will finally choose route R11232 to gateway 23, and satisfy the QoS requirement for this call.

The present invention is also scalable for adding more VRF routes. For example, one more new VRF route can be created between gateway 11 and gateway 21. At the same time, one more new gateway, gateway 24, is added in Zone 2 for relaying the call, and gateway 24 has VRF routes with gateway 11. It is not manageable through manual configurations for more pairs of IP addresses if more and more VRF routes are created between two zones. Instead, by using the present invention, the chosen VRF route is dynamic and can be determined automatically in a scalable environment such as a customer's environment.

Although a method and apparatus for providing optimal VoIP call routing in a VRF environment has been described in detail, it is to be understood that many modifications can be made to various embodiments of the present invention, without departing from the spirit thereof.

What is claimed is:

1. A method of providing VoIP (Voice over Internet Protocol) call routing in a virtual private network, comprising:
   a first gatekeeper issuing an information request to a first gateway, the first gateway including a first VRF (virtual private network routing and forwarding) routing table for a first set of VRF routes through the virtual private network;
   the first gatekeeper receiving VRF information from the first gateway, the information received being organized in a string;
   the first gatekeeper recommending to a second gatekeeper a transmission route through the virtual private network to the first gateway based on the VRF information received, the second gatekeeper receiving additional VRF information from a second gateway, the second gateway including a second VRF routing table for a second set of VRF routes through the virtual private network; and
   the second gatekeeper selecting the transmission route for a VoIP call through the virtual private network to the first gateway instead of a different transmission route indicated in the additional VRF information received from the second gateway.

2. The method of claim 1, wherein the VRF information comprises virtual routing information stored in the first VRF routing table of the first gateway.

3. The method of claim 1, wherein the VRF information comprises bandwidth predictions along a route through the virtual private network.

4. The method of claim 1, wherein the VRF information comprises a number of active cores through a given link.

5. The method of claim 1, wherein the VRF information comprises an indication of bursty/nonbursty traffic received over the first gateway.

6. The method of claim 1, wherein the VRF information comprises a rate of successful transmissions to at least one destination.

7. The method of claim 1, wherein the first gatekeeper comprises an H.323 gatekeeper.

8. The method of claim 1, wherein the first gateway comprises an H.323 gateway.

9. The method of claim 1, wherein the first gatekeeper comprises an MGCP (Media Gateway Control Protocol) call agent.

10. The method of claim 1, wherein the first gateway comprises an MGCP (Media Gateway Control Protocol) endpoint.

11. The method of claim 1, wherein the transmission route comprises a MPLS (Multiprotocol Label Switching)-based route.

12. The method of claim 1, wherein the first gatekeeper issues the request to a plurality of gateways in the first ciatekeeper's zone and receives a plurality of information strings from the gateways, wherein the first gatekeeper examines the plurality of strings to gather statistics about the first gatekeeper's zone.

13. The method of claim 12, wherein the first gatekeeper selects a pair of IP (Internet Protocol) addresses along with a VRF label subsequent to examining the plurality of strings.

14. The method of claim 1, wherein the second gatekeeper selects the transmission route for a VoIP call through the virtual private network during call set up with the first gatekeeper.

15. A first gatekeeper for routing VoIP (Voice over Internet Protocol) calls in a virtual private network, the first gatekeeper comprising:
- a communication connection with a second gatekeeper;
- a communication connection with each of at least one gateway located within the first gatekeeper's zone, each of the at least one gateway including a respective VRF (virtual private network routing and forwarding) table for VRF routes through the virtual private network; and
- a decision agent, the decision agent having instructions, which, when executed by the gatekeeper:
- issue an information request to the at least one gateway;
- receive VRF information from the at least one gateway; and
- recommend to the second gatekeeper a transmission route through the virtual private network from the second gatekeeper's zone to the first gatekeeper's zone based on the VRF information received.

16. A gateway for routing VoIP (Voice over Internet Protocol) calls in a virtual private network, the gateway comprising:
- a communication connection with a gatekeeper;
- at least one communication connection to at least one other gateway in the virtual private network;
- VRF (virtual private network routing and forwarding) tables for VRF routes through the virtual private network; and
- an update agent, the update agent comprising instructions, which, when executed by the gateway:
- determine preferred transmission routes through the virtual private network;
- communicates the preferred transmission routes to the gatekeeper;
- receive a recommended transmission route from the gatekeeper; and
- route VoIP traffic based on the recommended transmission route received from the gatekeeper.

17. The method of claim 1, wherein selecting the transmission route for a VoIP call through the virtual private network at the second gatekeeper includes load balancing among a plurality of gateways, the gateways including the first and second gateways.

* * * * *

UNITED STATES PATENT AND TRADEMARK OFFICE
CERTIFICATE OF CORRECTION

| | | |
|---|---|---|
| PATENT NO. | : 7,653,048 B2 | Page 1 of 1 |
| APPLICATION NO. | : 11/102085 | |
| DATED | : January 26, 2010 | |
| INVENTOR(S) | : Cao et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1329 days.

Signed and Sealed this

Twenty-eighth Day of December, 2010

David J. Kappos
*Director of the United States Patent and Trademark Office*